United States Patent
Xiong et al.

(10) Patent No.: US 12,051,397 B2
(45) Date of Patent: Jul. 30, 2024

(54) AUDIO PRIVACY PROTECTION FOR SURVEILLANCE SYSTEMS

(71) Applicant: Western Digital Technologies, Inc., San Jose, CA (US)

(72) Inventors: Shaomin Xiong, Newark, CA (US); Toshiki Hirano, San Jose, CA (US); Pritam Das, Dublin, CA (US); Ramy Ayad, East Brunswick, NJ (US); Rajeev Nagabhirava, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 57 days.

(21) Appl. No.: 17/176,697

(22) Filed: Feb. 16, 2021

(65) Prior Publication Data

US 2022/0172700 A1    Jun. 2, 2022

Related U.S. Application Data

(60) Provisional application No. 63/119,865, filed on Dec. 1, 2020.

(51) Int. Cl.
| | | |
|---|---|---|
| G10K 11/175 | (2006.01) | |
| G06F 21/32 | (2013.01) | |
| G06F 21/62 | (2013.01) | |
| G06V 20/40 | (2022.01) | |
| G06V 20/52 | (2022.01) | |
| G06V 40/16 | (2022.01) | |
| G10L 17/06 | (2013.01) | |
| G10L 21/028 | (2013.01) | |
| G10L 25/57 | (2013.01) | |
| H04N 5/76 | (2006.01) | |
| H04N 5/77 | (2006.01) | |
| H04N 9/802 | (2006.01) | |

(Continued)

(52) U.S. Cl.
CPC .......... *G10K 11/1754* (2020.05); *G06F 21/32* (2013.01); *G06V 20/40* (2022.01); *G06V 40/172* (2022.01); *G10L 17/06* (2013.01); *G10L 21/028* (2013.01); *G10L 25/57* (2013.01); *H04N 5/76* (2013.01); *G06V 20/44* (2022.01)

(58) Field of Classification Search
USPC .................................................. 386/239–248
See application file for complete search history.

(56) References Cited

U.S. PATENT DOCUMENTS

| | | | | |
|---|---|---|---|---|
| 9,641,676 B1 * | 5/2017 | Mandic | ................... | G06F 21/80 |
| 10,192,061 B2 | 1/2019 | Kumar | | |
| 10,649,727 B1 * | 5/2020 | Douglas | ................. | H04L 67/34 |

(Continued)

OTHER PUBLICATIONS

Crocco, Marco et al., Audio Surveillance: A Systematic Review, ACM Comput. Surv. 48, 4, Article 52, Oct. 7, 2014, p. 1-44.

(Continued)

*Primary Examiner* — Hung Q Dang
(74) *Attorney, Agent, or Firm* — Patent Law Works LLP

(57) ABSTRACT

Systems and methods for audio privacy in network video surveillance systems are described. A video camera may include an image sensor and a microphone to generate a video stream. Responsive to detecting a human speaking condition in the video stream, the audio data may be selectively modified to mask a human voice component of the audio data for storing and/or displaying the surveillance video stream.

20 Claims, 7 Drawing Sheets

(51) Int. Cl.
*H04N 9/804* (2006.01)
*H04N 9/82* (2006.01)

(56) References Cited

U.S. PATENT DOCUMENTS

| | | | |
|---|---|---|---|
| 10,747,894 B1* | 8/2020 | Cline | G10L 15/22 |
| 10,789,385 B1* | 9/2020 | Jayapalan | G06F 16/5866 |
| 2005/0226395 A1* | 10/2005 | Benco | H04M 3/42221 |
| | | | 379/85 |
| 2013/0002840 A1* | 1/2013 | Toney | H04N 5/76 |
| | | | 348/61 |
| 2014/0278366 A1* | 9/2014 | Jacob | G10L 15/30 |
| | | | 704/235 |
| 2016/0066036 A1* | 3/2016 | Felt | G11B 27/34 |
| | | | 386/241 |
| 2017/0048275 A1* | 2/2017 | John | H04L 63/108 |
| 2017/0220816 A1 | 8/2017 | Matusek et al. | |
| 2019/0066686 A1 | 2/2019 | Baracaldo Angel et al. | |
| 2019/0138748 A1 | 5/2019 | Long et al. | |
| 2019/0341050 A1* | 11/2019 | Diamant | H04N 7/147 |
| 2019/0348076 A1* | 11/2019 | Hershfield | H04N 7/181 |
| 2019/0377901 A1* | 12/2019 | Balzer | H04L 63/0421 |
| 2019/0392194 A1* | 12/2019 | Croxford | G06F 18/2431 |
| 2020/0143838 A1 | 5/2020 | Peleg et al. | |
| 2020/0175961 A1* | 6/2020 | Thomson | G10L 15/28 |
| 2020/0213319 A1* | 7/2020 | Bowie | H04L 63/108 |
| 2021/0295851 A1* | 9/2021 | Merkel | H04L 12/1831 |
| 2021/0327419 A1* | 10/2021 | Aher | G10L 15/24 |

OTHER PUBLICATIONS

International Search Report and Written Opinion for International Application No. PCT/US2021/031972, mailed Jul. 28, 2021, 12 pgs.

* cited by examiner

AUDIO PRIVACY PROTECTION FOR SURVEILLANCE SYSTEMS

TECHNICAL FIELD

The present disclosure generally relates to video surveillance systems and, more particularly, to network video surveillance systems with audio privacy protection.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

Some video surveillance systems may be configured for capturing both image data and audio data in the video streams. For example, each video camera may include both an image sensor and at least one microphone (or microphone array) and encode a synchronized audio track with the image data in the video stream. Under normal operation, the video stream including the audio data may be stored by the server system and provided for display on the client or user systems with the captured audio intact. In some surveillance systems, analytics may be applied to the audio data for audio event detection and related alerts or triggers. For example, detection of a gunshot, baby cry, speech, fire alarm, etc. may trigger a system response, such as an alert or contacting emergency services. In some surveillance systems, audio may also be used for person-to-person communication, such as when a floor security guard may speak within the microphone range of one or more cameras to communicate with another security guard in a monitoring station displaying the video stream. The video stream with audio track may be stored, analyzed, and displayed for both its image and audio content.

In some applications and/or for some users, the audio data may be regarded as unnecessary, distracting, or raising privacy concerns. Some system configurations may not include audio capabilities or may allow the user to disable the audio capture and/or display, such as to assure privacy of conversations in the monitored areas. In some surveillance systems, audio capabilities may be enabled or disabled based on a rule-based system, such as selectively enabling or disabling audio capture in specific locations or at predefined times.

A more robust and automated system for managing audio privacy while still capturing and using other audio data in video surveillance systems may be advantageous. A more flexible and reliable way to provide selectively enabled audio privacy protection in video surveillance systems may be needed.

SUMMARY

Various aspects for audio privacy protection in video surveillance systems, particularly selective audio modification when a human speaking condition is detected, are described.

One general aspect includes a system that includes a video camera and a controller. The video camera may include: an image sensor configured to capture image data for a video stream, and a microphone configured to capture audio data for the video stream. The controller may be configured to: receive the video stream from the video camera; determine a human speaking condition from the video stream; selectively modify, responsive to determining the human speaking condition, the audio data in the video stream during the human speaking condition; and store the video stream with the modified audio data.

Implementations may include one or more of the following features. Selectively modifying the audio data in the video stream during the human speaking condition may include processing the audio data to mask a human voice component of the audio data. The controller may be further configured to determine the human voice component of the audio data during the human speaking condition. Processing the audio data to mask the human voice component of the audio data may include: separating the human voice component of the audio data from a non-voice remainder component of the audio data; selectively masking the human voice component of the audio data; and leaving the non-voice remainder component of the audio data unchanged. Processing the audio data to mask the human voice component of the audio data may further include: separating the human voice component of the audio data into a plurality human voice components corresponding to individual speakers of the plurality of speakers; identifying at least one individual speaker of the plurality of speakers; and selectively masking, responsive to identifying the at least one individual speaker, a portion of the human voice component of the audio data corresponding to the at least one individual speaker. The controller may be further configured to: detect an audio event from the audio data in the video stream; and process, using a voice recognition algorithm, the audio data in the video stream during the human speaking condition to identify a protected speaker. Determining the human speaking condition from the video stream may be responsive to detecting the audio event and selectively modifying the audio data in the video stream during the human speaking condition may be further responsive to identifying the protected speaker. The controller may be further configured to process, using a voice recognition algorithm, the audio data in the video stream to identify a consent pattern and selectively modifying the audio data in the video stream during the human speaking condition may be further responsive to an absence of the consent patter in the audio data. The controller may be further configured to detect a video event from the image data in the video stream and determining the human speaking condition from the video stream may be responsive to detecting the video event. The controller may be further configured to process, using a facial recognition algorithm, the image data in the video stream to identify a protected speaker and selectively modifying the audio data in the video stream during the human speaking condition may be further responsive to identifying the protected speaker. The system may include a storage device, an analytics engine, and a user device. The storage device may be configured to store an unmodified video stream from the video camera and the video stream with the modified audio data from the controller. The analytics engine may be configured to: process the unmodified video stream to determine the human speaking condition from the video stream; and notify the controller of the human speaking condition. The user device may be configured to: display, using a graphical user interface and a speaker of the user device, the video stream with the modified audio data to a user; determine a security credential for the user; verify an audio access privilege corresponding to the security credential; and display, using the graphical user interface and the speaker of the user device, the unmodified video stream to the user.

Another general aspect includes a computer-implemented method that includes: receiving a video stream from a video camera, where the video camera may include an image sensor configured to capture image data for the video stream; and a microphone configured to capture audio data for the video stream; determining a human speaking condition from the video stream; selectively modifying, responsive to determining the human speaking condition, the audio data in the video stream during the human speaking condition; and storing the video stream with the modified audio data.

Implementations may include one or more of the following features. Selectively modifying the audio data in the video stream during the human speaking condition may include processing the audio data to mask a human voice component of the audio data. The computer-implemented method may include determining the human voice component of the audio data during the human speaking condition. Processing the audio data to mask the human voice component of the audio data may include: separating the human voice component of the audio data from a non-voice remainder component of the audio data; selectively masking the human voice component of the audio data; and leaving the non-voice remainder component of the audio data unchanged. The computer-implemented method may include detecting an audio event from the audio data in the video stream, where determining the human speaking condition from the video stream is responsive to detecting the audio event. The computer-implemented method may include processing, using a voice recognition algorithm, the audio data in the video stream to identify a protected speaker, where selectively modifying the audio data in the video stream during the human speaking condition is further responsive to identifying the protected speaker. The computer-implemented method may include processing, using a voice recognition algorithm, the audio data in the video stream to identify a consent pattern, where selectively modifying the audio data in the video stream during the human speaking condition is further responsive to an absence of the consent pattern in the audio data. The computer-implemented method may include: detecting a video event from the image data in the video stream, where determining the human speaking condition from the video stream is responsive to detecting the video event; and processing, using a facial recognition algorithm, the image data in the video stream to identify a protected speaker, where selectively modifying the audio data in the video stream during the human speaking condition is further responsive to identifying the protected speaker. The computer-implemented method may include: storing, in a storage device, an unmodified video stream from the video camera and the video stream with the modified audio data; processing the unmodified video stream to determine the human speaking condition from the video stream; displaying, using a graphical user interface and a speaker of a user device, the video stream with the modified audio data to a user; determining a security credential for the user; verifying an audio access privilege corresponding to the security credential; and displaying, using the graphical user interface and the speaker of the user device, the unmodified video stream to the user.

Still another general aspect includes a surveillance system including: a video camera that includes an image sensor configured to capture image data for a video stream and a microphone configured to capture audio data for the video stream; a processor; a memory, means for receiving the video stream from the video camera; means for automatically determining a human speaking condition from the video stream; means for selectively modifying, responsive to determining the human speaking condition, the audio data in the video stream during the human speaking condition; and means for displaying the video stream using the modified audio data.

The various embodiments advantageously apply the teachings of computer-based surveillance systems to improve the functionality of such computer systems. The various embodiments include operations to overcome or at least reduce the issues previously encountered in video surveillance systems and, accordingly, are more effective and/or flexible than other video surveillance systems. That is, the various embodiments disclosed herein include hardware and/or software with functionality to improve audio privacy protection in video surveillance systems, such as by using selective audio modification when a human speaking condition and/or other event triggers are met. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
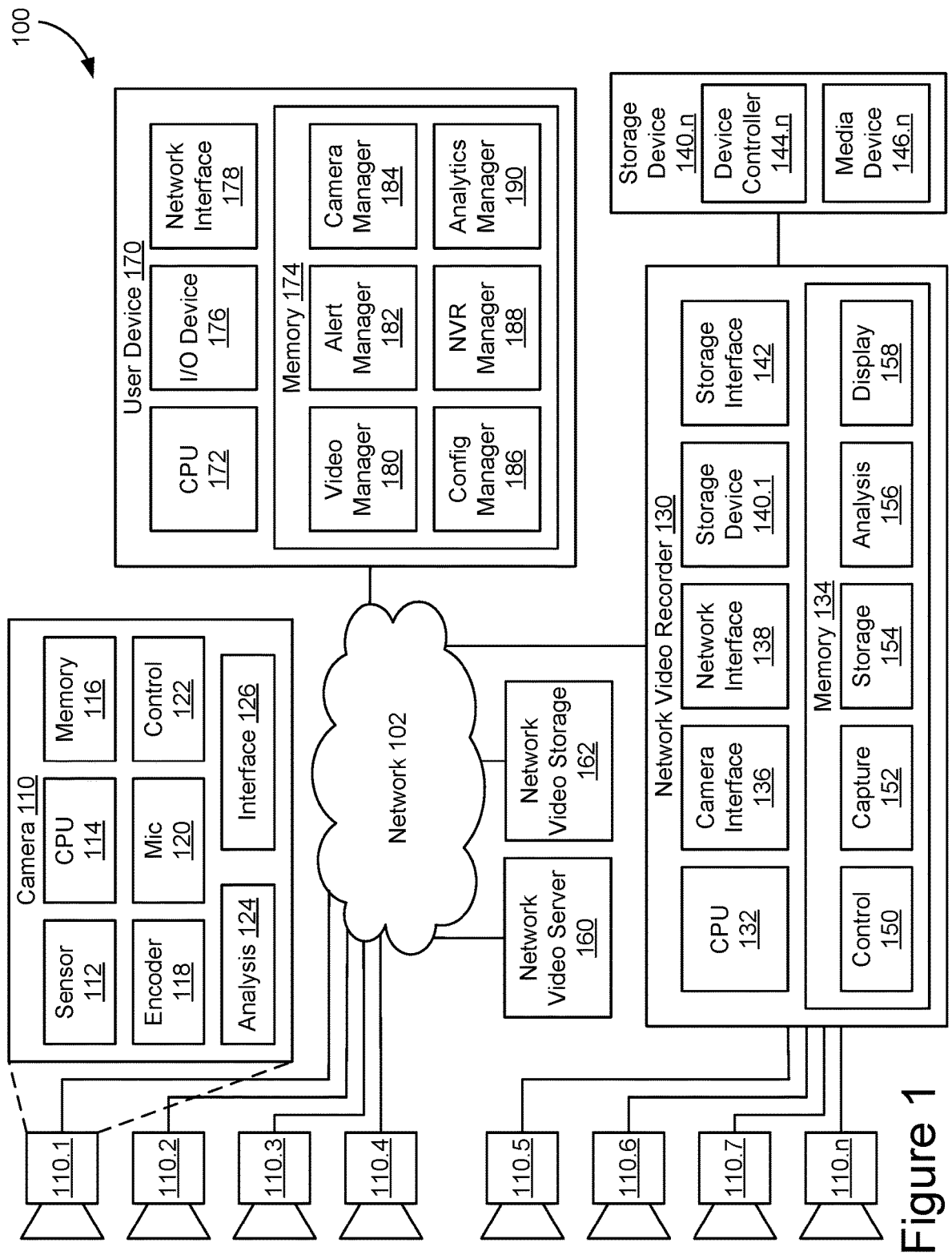
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.*n* in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. Cameras 110 may be configured for capturing both image and audio data in a video stream. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones and include embedded and/or synchronized audio streams in their respective video streams. In some embodiments, video cameras 110 may include an image sensor 112, a processor or central processing unit CPU 114, a memory 116, an encoder 118, a microphone 120, a control circuit 122, and/or a network interface 126. In some embodiments, video cameras 110 may include onboard analytics, such as a video analysis subsystem 124.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios.

Digital video data from image sensor 112 may be received by processor 114 for (temporary) storage and processing in memory 116 and/or encoding by encoder 118. Processor 114 may include any type of conventional processor or microprocessor that interprets and executes instructions. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

In some embodiments, one or more microphones 120 may be selectively enabled to capture audio data in parallel with the image data captured by image sensor 112. For example, microphone 120 may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor control signals for a plurality of actuators that control the position of camera 110. In some embodiments, control circuit 122 may include logic for automatically responding to movement detected through image sensor 112 to redirect camera 110 toward the source of movement. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130 and/or user device 170 to configure video formats, enable and disable microphone 120, set motion detection, auto tracking, and similar features, and/or initiate video data streaming.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.*n*. In some embodiments, camera interface 136 may include a PoE network switch for providing power to connected cameras and routing data packets to and from cameras 110.5-110.*n*, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives (SSDs). In some embodiments, network video recorder 130 may include internal storage device 140.1 and expandable storage that enables additional storage devices 140.*n* to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives (HDDs). In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), or triple-level cells.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, manage microphone 120 and related parameters, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154, video analysis subsystem 156, and/or video display subsystem 158. Video capture subsystem 152 may receive camera video streams that include embedded audio data synchronized with the image data. In some embodiments, video capture subsystem 152 may be configured to handle the combined audio/image video stream and/or separate the audio track into a separate audio stream for storage, analysis, and/or display.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110 for generating metadata, detecting events and related triggers, and/or further processing of the camera video streams. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, voice recognition, speech recognition, and/or other algorithms to determine events occurring in a video stream and tag them in a corresponding metadata track and/or separate metadata table associated with the video data object. In some embodiments, video streams and/or portions thereof may be tagged with condition markers or tags. For example, video analysis subsystem 156 may determine a human speaking condition based on audio detection and/or speech recognition, or a low light condition from the light, color, and/or wavelength bandwidth present in the video data, and add appropriate tags. In some embodiments, video analysis subsystem 156 may include event handling logic for determining response to detection of one or more detected events, such as raising an alert to user device 170, initiating further video processing, and/or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model, such as a voice detection analytics engine, a voice recognition analytics engine, an object recognition analytics engine, a facial recognition analytics engine, etc.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may support video streams with or without audio data and/or enable audio channels in the video streams to be selectively provided to user device 170. For example, some user devices may be configured not to receive audio data and others may selectively receive one or more audio channels based on user identification and/or security credentials. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, audio channels, etc.), detected video event metadata (event time, location, type, parameters, event conditions, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, use device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more I/O devices 176. For example, a graphical display, such as a monitor and/or touch screen display, and/or other user interface components such as a keyboard, a mouse, function buttons, speakers, microphone, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder (NVR) manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may display or play audio data from video streams through speakers in or connected to user device 170. For examples, video streams may have accompanying audio channels or tracks for providing synchronized audio data with video streams being displayed on user device 170. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data. In some embodiments, access to video streams through video display subsystem 158 may be dependent on user identification, security credentials, and/or access privileges.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, user identification and security credentials, storage options, and other configuration settings. NVR manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
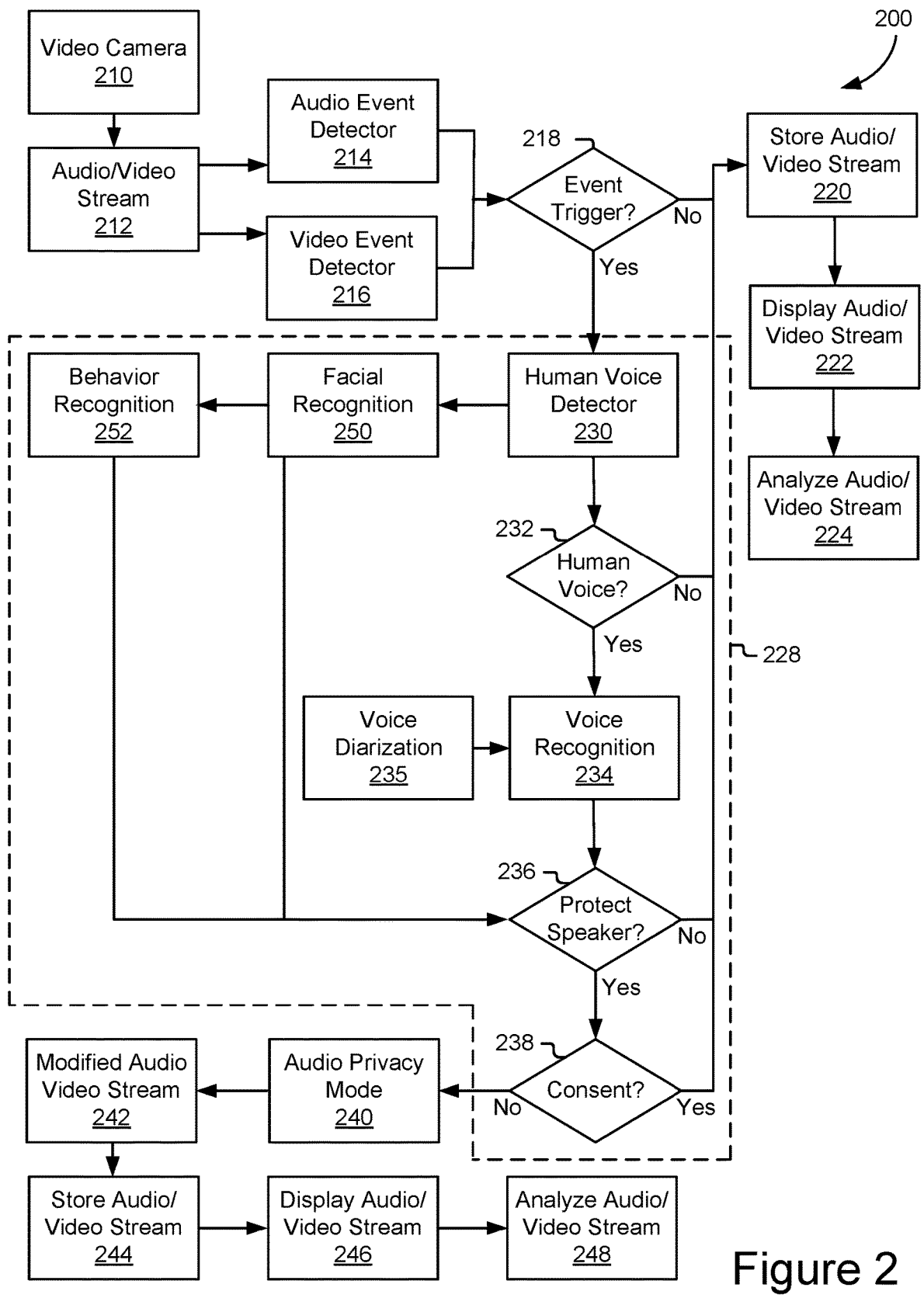
FIG. 2 schematically illustrates audio privacy mode handling that may be used by the computer-based surveillance system of FIG. 1.

FIG. 2 shows a schematic representation of audio privacy mode handling that may be implemented in a computer-based surveillance system 200, such as surveillance system 100 in FIG. 1. Video camera 210, similar to cameras 110 in FIG. 1, may be configured to capture image data from light waves striking an image sensor and audio waves received by a microphone. An audio/video stream 212 (e.g., a video stream that include at least one audio channel with synchronized audio data) may be generated by camera 210.

Audio/video stream 212 may be streamed to an audio event detector 214 and/or a video event detector 216 to determine whether a human speaking condition exists in one or more frames of the audio and/or video data. For example, video camera 210 may include an automated control circuit that identifies human speech events from the audio data. In another example, event detection for a human speaking condition may be a function of a network video recorder, such as network video recorder 130 in FIG. 1, receiving audio/video data 212 from video camera 210. The network video recorder may process the real-time video stream from video camera 210 to determine whether a human speaking condition exists based on the audio data, video data, or a combination thereof. For example, audio event detector 214 may include a human voice detector algorithm or a voice recognition algorithm for determining the presence of one or more people talking in the audio data. In another example, video event detector 216 may use behavior recognition based on facial features or body language suggestive of one or more people in the video images speaking. At decision block 218, if an audio or video event corresponding to human speech is detected, further processing 228 may occur using human voice detector 230, voice recognition 234, facial recognition 250, and/or behavior recognition 252 to determine whether an audio protection mode should be initiated for the human speech or the event trigger may be sufficient to initiate audio privacy mode 240 without further processing 228. Otherwise, a normal processing of audio/video stream 212 without modified audio may proceed at blocks 220, 222, and 224.

If no event triggers indicating human speech are detected at block 218, then audio/video stream 212 does not have a human speaking condition. At block 220, audio/video stream 212 may be stored in persistent storage. For example, a network video recorder may store an encoded audio/video stream in one or more storage devices configured for surveillance video storage. At block 222, audio/video stream 212 may be displayed to a user with the original audio data. For example, the network video recorder may stream audio/video stream 212 to a user display, such as a graphical user display and speakers on user device 170, for monitoring or review. At block 224, audio/video stream 212 may be analyzed for additional events and/or further processing unrelated to audio privacy mode. For example, the network video recorder may include one or more analytics engines for detecting various event types, adding/modifying related metadata, raising alerts or notifications, and/or initiating further processing of the image and/or audio data.

In some embodiments, further processing 228 may result from event trigger 218. In some embodiments, some or all of human voice detector 230, voice recognition 234, facial recognition 250, and/or behavior recognition 252 may be included in audio event detector 214 and/or video event detector 216. Further processing 228, may represent example additional criteria and/or event evaluation logic for determining whether audio privacy mode 240 should be initiated and different implementations may use some or all for enabling audio privacy mode 240 after a human speaking condition has initially been determined.

Human voice detector 230 may include a processor configured to detect the presence of a human voice within an audio data stream. For example, human voice detector 230 may process the audio data from audio/video stream 212 to detect audio data signatures indicative of human speech within a broader range of audio artifacts that include the background, ambient, and/or other non-voice sound sources. In some embodiments, an analytics engine may execute a voice activity detection (VAD) algorithm targeting audio/video stream 212 and/or the audio channel therefrom to detect the presence or absence of human speech. For example, the algorithm may focus on the presence of frequencies common to human speech and/or signal patterns indicative of speech tones and patterns. At block 232, if no human voice is detected, audio privacy mode may not be needed and handling of audio/video stream 212 may continue to block 220. If a human voice is detected, a human speaking condition may be tagged. In some embodiments, the human speaking condition is sufficient to trigger audio privacy mode 240. In some embodiments, additional processing of the audio data containing the human voice may be required before initiating audio privacy mode.

Voice recognition 234 may include a processor configured to detect the presence or absence of individual human voices. For example, voice recognition 234 may process the audio data from audio/video stream 212 and compare the human voice patterns in the audio data to one or more known voiceprints. In some embodiments, an analytics engine may execute voice recognition, speaker recognition, or voice authentication against a voice library of recognized users. By comparing a set of unique audio factors that make up a human voice (voiceprint) to the human voice in the audio data, voice recognition 234 may identify whether the speaker is known and, if so, whether the speaker is a protected speaker for enabling audio privacy mode. For example, surveillance system 200 may include a protected speaker list that identifies individuals for whom audio privacy mode should be enabled and includes their voiceprints for use by voice recognition 234. In some embodiments, voice recognition 234 may support voice diarization 235, where multiple individual speakers are detected and/or identified in the same human voice audio data. For example, where the audio/video stream includes multiple speakers, such as a conversation among multiple parties, voice diarization 235 may support identifying and tracking a plurality of individual speakers and their voice contributions to the collective audio stream. At block 236, if a speaker is not protected, audio privacy mode may not be needed and handling of audio/video stream 212 may continue to block 220. If a protected speaker is detected, the protected speaker identifier may be tagged. In some embodiments, the protected speaker identifier is sufficient to trigger audio privacy mode 240. In some embodiments, additional processing of the audio data containing the identified speaker may be required before initiating audio privacy mode.

In some embodiments, voice recognition 234 may also include speech recognition for identifying specific phrases that signal consent to be recorded. For example, voice recognition 234 may process audio data from audio/video stream 212 to extract specific words or phrases from the human voice. In some embodiments, detection of consent patterns may enable audio privacy mode to be bypassed or disabled if a speaker on the protected speaker list wishes to be recorded and their speech displayed through surveillance system 200. For example, the analytics engine may include a library of consent patterns representing phrases that may be used by the speaker to indicate consent to be recorded. At block 238, if the speaker indicates consent to be recorded, audio privacy mode may not be needed and handling of audio/video stream 212 may continue to block 220. If no consent is given, audio privacy mode 240 may be initiated. In some embodiments, speech recognition for determining consent to be recorded may be a default response when a human speaking condition is detected, with or without speaker recognition. For example, surveillance system 200 may default to enabling audio privacy mode for all speakers to preserve privacy unless consent is proactively given and detected by voice recognition 234.

Audio privacy mode 240 may include metadata tags and/or operational states for the processing, storage, and display of audio/video stream 212 with audio privacy mode enabled. For example, audio privacy mode 240 may include an operating mode that masks the human voice or speech component of an audio channel of audio/video stream 212. Audio privacy mode 240 may be enforced by a modified audio video stream 242 that masks the human voice component. For example, the audio data may be modified by separating the human voice component and removing it or replacing it with white noise, a replacement tone, or another audio feature that prevents a user from hearing the speech when the video stream is displayed. In some embodiments, modified audio video stream 242 may be tagged or accompanied by metadata that indicates that audio privacy mode has been enabled.

Once modified, further use of modified audio/video stream 212 will protect the audio privacy of the human speech in the video stream. At block 244, modified audio/video stream 242 may be stored in persistent storage. For example, a network video recorder may store an encoded audio/video stream in one or more storage devices configured for surveillance video storage. At block 246, modified audio video stream 242 may be displayed to a user with the modified audio data protecting the human speech component. For example, the network video recorder may stream modified audio video stream 242 to a user display, such as a graphical user display and speakers on user device 170, for monitoring or review. At block 248, modified audio video stream 212 may be analyzed for additional events and/or further processing unrelated to audio privacy mode. For example, the network video recorder may include one or more analytics engines for detecting various event types, adding/modifying related metadata, raising alerts or notifications, and/or initiating further processing of the image and/or audio data.

In some embodiments, video event detector 216 and/or additional processing 228 may include facial recognition 250 and/or behavior recognition 252 for processing the image data of audio/video stream 212 to determine speaker identities and/or consent patterns. In some embodiments, facial recognition 250 may operate similarly to voice recognition 234 for identifying protected speakers, but based on facial vectors in image data rather than voiceprints in audio data. In some embodiments, behavior recognition 252 may operate similarly to voice recognition 234 for identifying consent of a speaker to be recorded, but based on visual consent patterns in body language or gestures rather than speech content.

Figure 3:
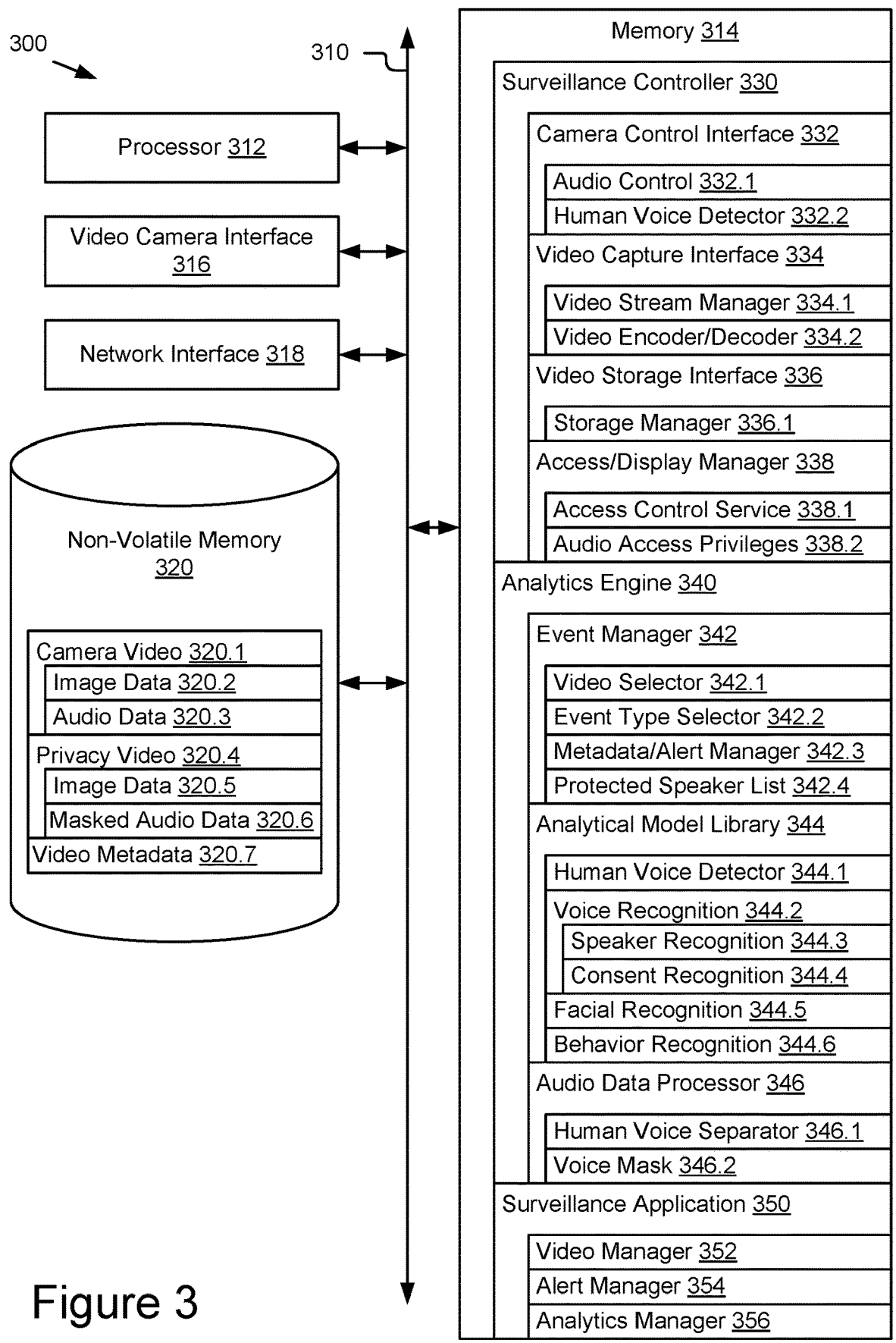
FIG. 3 schematically illustrates some elements of the computer-based surveillance system of FIG. 1.

FIG. 3 schematically shows selected modules of a surveillance system 300 configured for selective audio privacy mode. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events and/or initiate further processing for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include control signals, commands, or messages for manipulating specific features of one or more cameras. For example, camera control interface 332 may include a control signal for audio control 332.1. In some embodiments, audio control 332.1 may include an API and corresponding logic for enabling and/or disabling a microphone in the selected camera by sending command messages or signals to the camera. In some embodiments, camera control interface 332 may include a human voice detector 332.2 configured to detect a human speaking condition. For example, a human speaking condition may be determined from frequency ranges and other audio signal patterns that correlate with human speech. The audio signal or data may be compared against a set of human voice audio characteristics for determining the human speaking condition. In some embodiments, audio control 332.1 may disable the microphone of the camera responsive to human voice detector 332.2 detecting a human speaking condition. For example, a simple audio privacy mode may be enabled by camera control interface 332 being configured to disable the microphone or filter the human voice frequencies responsive to detecting the human speaking condition, such that the encoded video stream available to other components does not include or masks the human voice component. In some embodiments, the functions of enabling and disabling the microphone in response to detecting the human speaking condition may be embodied in similar hardware and/or software functions within each video camera and camera control interface 332 may merely enable the simple audio privacy mode response feature through a camera configuration parameter.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. Video capture interface 334 may be configured to pass each received video stream to video storage interface 336, analytics engine 340, and/or access/display manager 338. For example, received video streams may be buffered by video capture interface before being streamed to video storage interface 336, analytics engine 340, and/or access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components.

In some embodiments, video capture interface 334 may include a video stream manager 336.1 configured to identify and manage the plurality of video streams being received from the cameras. For example, video stream manager 336.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths. For example, the storage path (through video storage interface 336), the display path (through access/display manager 338), and/or the analytics path (through analytics engine 340) may each be configured for specific processing, priority, and timing. In some embodiments, video stream manager 334.1 may be configured to use encoder/decoder 334.2 to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters. In some embodiments, video capture interface 334 may be configured to identify audio channels in received video streams and encoder/decoder 334.2 may be configured to encode and decode synchronized audio data in the audio channels of audio/video streams.

Video storage interface 336 may include storage interface protocols and a set of functions, parameters, and data structures for managing storage of video data in non-volatile memory 320, such as storage devices and/or network video storage, for later retrieval and use by access/display manager 338 and/or analytics engine 340. For example, video storage interface 336 may write camera video stream data 320.1 from video data buffers and/or storage path video data from video capture interface 334 to non-volatile memory 320. In some embodiments, video storage interface 336 may include a storage manager 336.1 configured to manage video storage space in non-volatile memory 320 in accordance with one or more data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 336 may also receive and store video metadata 320.7 as tags or metadata tracks in the video data or in an associated metadata table, file, or similar data structure associated with the corresponding video data objects.

In some embodiments, video storage interface 336 may be configured to store video streams in multiple formats. For example, video storage interface 336 may support a normal video format, such as camera video stream data 320.1, and an audio privacy mode format, such as privacy video stream data 320.4. In some embodiments, camera video stream data 320.1 may include image data 320.2 and audio data 320.3 encoded in a synchronized video stream format. For example, camera video stream data 320.1 may be the camera video stream received from an attached camera and in the format encoded by the video camera and/or a standard video storage format supported by video storage interface 336 for storing video streams. In some embodiments, privacy video stream data 320.4 may include image data 320.5 and masked audio data 320.6 encoded in a synchronized video stream format. For example, privacy video stream data 320.4 may be based on camera video stream data 320.1, where audio data 320.3 has been modified into masked audio data 320.6 to remove or obscure one or more human voices when an audio privacy mode is enabled and a human speaking condition is detected. In some embodiments, image data 320.2 and image data 320.5 may be the same. In some embodiments, storage manager 336.1 assigns or receives storage locations for stored video data and provides the storage locations corresponding to the different video paths to the respective consumer components. For example, storage manager 336.1 may provide the storage location for privacy video stream data 320.4 to access/display manager 338 and camera video stream data 320.1 to analytics engine 340. In some embodiments, storage manager 336.1 may initially provide camera video stream data 320.1 to analytics engine 340 to determine and process the video stream for voice privacy mode and then receive privacy video stream data 320.4 from analytics engine 340 for storage.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet.

In some embodiments, access/display manager 338 may include controls for determining what surveillance applications and users thereof can access specific video streams, features, and/or configuration parameters. For example, access/display manager 338 may include an access control service 338.1 for validating one or more security credentials for authenticating a user. In some embodiments, access control service 338.1 may include a username or similar user identifier coupled with one or more security credentials, such as passwords, biometric authentication, security questions, validation codes, etc. for authenticating the user. In some embodiments, based on authenticating the user, the user identifier or profile may be associated with a set of access privileges for the video streams, features, and configuration parameters of surveillance system 300. For example, each user profile may be associated with user settings that determine their access, such as different user levels (e.g., system administrator, owner/super-user, monitor/user, etc.) with different access privileges and or customized user setting that may be configured at system setup or by a user with system administrator credentials. In some embodiments, user settings may include audio access privileges 338.2 that may determine whether the user is able to bypass audio privacy mode. For example, normal users may have general audio access privileges that only allow access to the privacy protected versions of video streams, such as privacy video stream data 320.4 if audio privacy mode is enabled for that video. System administrators, super-users, and/or designated user profiles may be configured to access both privacy video stream data 320.4 and camera video stream data 320.1 for audio privacy mode videos, to hear either the original audio data 320.3 or masked audio data 320.6. In some embodiments, user profiles may also be used to determine and associate voiceprints for speaker recognition features. For example, some or all users may provide sample audio data for generating and storing a voiceprint and may configure corresponding protected speaker and/or default consent parameters for enabling or disabling audio privacy mode when their voices are detected.

Analytics engine 340 may include interface protocols, functions, parameters, and data structures for analyzing video data to detect video events, add them to video metadata, raise alerts, such as through surveillance application 350, and/or provide additional processing based on detected events or conditions, such as masking human speaker data for audio privacy mode. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with onboard analytics, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342, analytical model library 344, and audio data processor 346. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types, updating or adding metadata parameters describing the detected video events, and/or triggering additional actions, such as alerts, notifications, and/or additional processing. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include a video selector 342.1 configured to select target video streams or video data sets for analysis. For example, video selector 342.1 may identify a real-time video stream for near real time analysis or a bounded video data set, such as video with a specified camera identifier and timestamps between beginning and ending time markers and/or including a defined set of metadata parameters.

Event manager 342 may include an event type selector 342.2 configured to determine one or more event types to be detected from the selected video data. For example, an analytics configuration may be configured to analyze the selected video stream for a predefined set of motion detection, tripwire detection, object recognition, facial recognition, audio detection, speech recognition, and/or similar video event types. Each event type may map or correspond to an analytical model type, set of parameters, and one or model weights for defining an event detection algorithm stored in analytical model library 344 for use by analytics engine 340 to detect potential video events. In some embodiments, event manager 342 may be configured for detecting human speaking conditions and initiating logic for determining an audio privacy mode. For example, event type selector 342.2 may be configured with a sequence of audio and/or video events related to determining the audio privacy mode and related logic for determining whether audio privacy mode should be tagged for a video stream (or portion thereof) and forwarded to audio data processor 346 for audio privacy processing.

In some embodiments, event manager 342 may include detected event handling logic for determining response to detection of one or more detected events. For example, a metadata/alert manager 342.3 may add one or more detected event tags to video metadata 320.7, send an alert or notification to access/display manager 338 for communication to surveillance application 350, and/or initiate an additional sequence of event detections and/or processing. In some embodiments, metadata/alert manager 342.3 may include a set of logical rules responsive to a plurality of sequential and/or parallel detection events, with related tags, alert triggers, and processing steps defined within the set of logical rules. For example, an audio privacy mode set of rules in metadata/alert manager may be configured similar to additional processing 228 in FIG. 2 for logically navigating a series of event detections using different analytical models, such as human voice detection, voice (speaker) recognition, voice diarization (multiple speaker recognition), voice (consent) recognition, facial recognition, and/or behavior recognition, and related outcomes. Each event detection may result in one or more metadata tags being added to video metadata 320.7 and, in some cases, triggering additional event detection processes, alerts, and/or video processing. In some embodiments, metadata/alert manager 342.3 may include logic that depends on additional conditions or data structures outside of analytical model library 344 and the target video data and metadata. For example, an audio privacy mode may use a protected speaker list 342.4 or another data structure for making a logical determination, such as whether audio protection mode processing should be initiated for an identified speaker. In some embodiments, such additional condition information may be received or accessed from other system components, such as protected speaker list 342.4 being configured through user profile parameters in access/display manager 338.

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target parameters (e.g. cars, license plates, equipment, people, voiceprints, consent patterns, etc.), and/or training conditions. Each analytical model may include a set of base equation(s) for the analytical model type, set of target parameters, and one or model weights that determine the event detection algorithm that will be used for the event detection processing. In some embodiments, analytical model library 344 may include different sets of analytical models for different video conditions. In some embodiments, analytical model library 344 may include sets of analytical models related to a defined processing sequence, such as determining an audio privacy mode. In some embodiments, each analytical model may include or be supported by respective APIs and functions, parameters, and data structures for processing a target video stream using one or more corresponding detection algorithms.

In some embodiments, analytics engine 340 may include or access human voice detector 344.1 for determining whether a human voice is present in audio data, such as audio data 320.3, and adding a human speaking condition tag to video metadata 320.7. Human voice detector 344.1 may include a processor configured to detect the presence of a human voice within an audio data stream. For example, human voice detector 344.1 may process the audio data 320.3 to detect audio data signatures indicative of human speech within a broader range of audio artifacts that include the background, ambient, and/or other non-voice sound sources. In some embodiments, human voice detector 344.1 may execute a voice activity detection (VAD) algorithm targeting audio data 320.3 to detect the presence or absence of human speech. For example, the algorithm may focus on the presence of frequencies common to human speech and/or signal patterns indicative of speech tones and patterns.

In some embodiments, analytical model library 344 may include or access voice recognition engine 344.2 for processing a human voice component of audio data 320.3 for specific voiceprints, verbal, semantic, or emotional content, and/or other audio patterns indicative of speech content. In some embodiments, voice recognition engine 344.2 may include a processor configured to detect the presence or absence of individual human voices. For example, voice recognition engine 344.2 may include speaker recognition 344.3 to process the audio data 320.3 and compare the human voice patterns in the audio data to one or more known voiceprints. In some embodiments, voice recognition engine 344.2 may execute speaker recognition 344.3 against a voice library of recognized users, such as users configured in access/display manager 338. By comparing a set of unique audio factors that make up a human voice (voiceprint) to the human voice in the audio data, voice recognition engine 344.2 may identify whether the speaker is known and, if so, whether the speaker is a protected speaker for enabling audio privacy mode. For example, event manager 342 may include or access protected speaker list 342.4, which identifies individuals for whom audio privacy mode should be enabled and includes their voiceprints for use by voice recognition engine 344.2. In some embodiments, speaker recognition 344.3 may support voice diarization, where a plurality of individual speakers are detected, identified, and/or tracked through the voice component of audio data 320.3. For example, multiple voice patterns and corresponding individual speakers (known or unknown) may be identified in separate human voice components and decision logic may be applied to protected speakers, unprotected speakers, and combinations thereof, as well as segmenting the human voice component over time for changes in speaker during portions of the audio data. In some embodiments, voice recognition engine 344.2 may also include speech recognition for identifying specific phrases that signal consent to be recorded. For example, consent recognition 344.4 may process audio data 320.3 to extract specific words or phrases from the human voice component. In some embodiments, detection of consent patterns may enable audio privacy mode to be bypassed or disabled if a speaker on the protected speaker list wishes to be recorded and their speech displayed through surveillance system 300. For example, consent recognition 344.4 may include a library of consent patterns representing phrases that may be used by the speaker to indicate consent to be recorded.

In some embodiments, analytical model library 344 may include or access facial recognition engine 344.5 for processing image data 320.2 for specific faces or other visual indicia of individual identity. In some embodiments, facial recognition engine 344.5 may operate similarly to speaker recognition 344.3 for identifying protected speakers, but based on facial recognition algorithms for facial vectors in image data rather than voiceprints in audio data. In some embodiments, analytical model library 344 may include or access behavior recognition engine 344.6 for processing image data 320.2 for specific consent patterns or behavior indicative of consent or no consent. In some embodiments, behavior recognition engine 344.6 may operate similarly to consent recognition 344.4 for identifying consent of a speaker to be recorded, but based on visual consent patterns in body language or gestures rather than speech content.

Audio data processor 346 may include an API and set of functions, parameters, and data structures for processing audio data from a video stream to enforce an audio privacy more. For example, audio data processor 346 may be configured to receive audio data 320.3 for camera video stream data 320.1 and return masked audio data 320.6 and/or privacy video stream data 320.4. In some embodiments, audio data processor 346 may be invoked by event manager 342 in response to logic indicating that an audio privacy mode should be triggered for the target video stream or video stream portion. Event manager 342 may add metadata tags and/or trigger operational states for the processing, storage, and display of privacy video stream data 320.4 with audio privacy mode enabled. In some embodiments, audio data processor 346 may first use human voice separator 346.1 to isolate the human voice or human speech component of audio data 320.3. For example, an algorithm similar to human voice detector 344.1 may be used to separate the human voice component of audio data 320.3 from a remainder component that includes ambient and background noise and/or other sound events that are not human voice. In some embodiments, human voice separator 346.1 may also support voice diarization and further separate the human voice component of audio data 320.3 into individual speaker voice components for a plurality of speakers. In some embodiments, a voice mask 346.2 may be applied to the separated human voice component and/or injected into the audio data in the frequency range in which the human speech was detected. For example, the human speech component of the data may be removed or countered with an inverse sound pattern to effectively delete the human speech component from audio data 320.3. As another example, the audio data may be modified by replacing it with white noise, a replacement tone, or another audio feature that prevents a user from hearing the speech when the video stream is displayed.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application 350. For example, surveillance application 350 may include a video manager 352, an alert manager 354, and an analytics manager 356.

Video manager 352 may include APIs and a set of functions, parameters, and data structures for navigating and displaying video streams from video cameras accessed through surveillance controller 330. For example, video manager 352 may include a graphical user interface and interactive controls for displaying lists, tables, thumbnails, or similar interface elements for selecting and displaying video streams for particular cameras, times, locations, and/or events. In some embodiments, video manager 352 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 352 may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

In some embodiments, video manager 352 may be configured to selectively provide an audio privacy video stream based on privacy video stream data 320.4 when an audio privacy mode is enabled, such as when a human speaking condition is detected. For example, video manager 352 may receive privacy video stream data 320.4 from access/display manager 338 as part of a display path triggered by audio privacy mode. Video manager 352 may enable playback of the audio privacy video stream, with image data 320.4 displaying on a graphical user display and masked audio data 320.6 displaying (or playing) through speakers. In some embodiments, video manager 352 may receive user identifiers and/or security credentials for authentication through access control service 338.1. For example, a user may sign into surveillance application 350 through a user interface on the user device hosting surveillance application 350. In some embodiments, some users may be able to selectively access both audio privacy video streams and camera video streams without modified audio data. For example, a video stream with audio privacy mode tags may initially display using privacy video stream data 320.4 and a user with audio access privileges that include audio privacy bypass may select to access or display the video stream based on camera video stream data 320.1 to hear the original audio data without the human voice component masked or otherwise modified. In some embodiments, video manager 352 may include an event overlay function 352.2 configured to overlay metadata tags and/or video event indicators on video streams being displayed to the user. For example, video manager 352 may read video metadata provided with the video stream to be displayed and determine one or more visual indicators, such as alphanumeric tags, graphical boxes or tiles, still or video image insets, etc., based on the video metadata. Audio privacy mode may be indicated to the user with such an overlay on the video stream with the masked audio data.

Alert manager 354 may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, alert manager 354 may include a plurality of preset alert conditions with associated event parameters and allow a user to enable and disable alert types and/or change associated event parameters. In some embodiments, alert manager 354 may be configured to operate in conjunction with event overlay function 352.2 to overlay graphical elements representing detected events or event indicators on video streams displayed through video manager 352. For example, detected motion, objects, or faces may be boxed or highlighted, tagged with relevant identifiers, or otherwise indicated in the video playback on the user device.

Analytics manager 356 may include APIs and a set of functions, parameters, and data structures for selecting, training, and managing event detection algorithms. For example, analytics manager 356 may include a user interface to analytical model library 344 for one or more analytics engines 340. In some embodiments, the event detection algorithms may include a set of parameters and/or model weights that are preconfigured based on training data sets processed independent of surveillance system 300. For example, analytics manager 356 may include object detection algorithms for common objects, situations, and camera configurations. In some embodiments, analytics manager 356 may include access to a training service and/or preconfigured training data sets. For example, analytics manager 356 may enable the user to define training data sets for determining or refining event detection algorithm parameters and/or model weights based on predefined base algorithms or models. In some embodiments, analytics manager 356 may interface directly with analytics engine 340 for selecting, training, managing, and using the event detection algorithms configured through analytics manager 356. In some embodiments, analytics manager 356 may interface with access/display manager 338 for accessing and managing one or more analytics engines 340.

Figure 4:
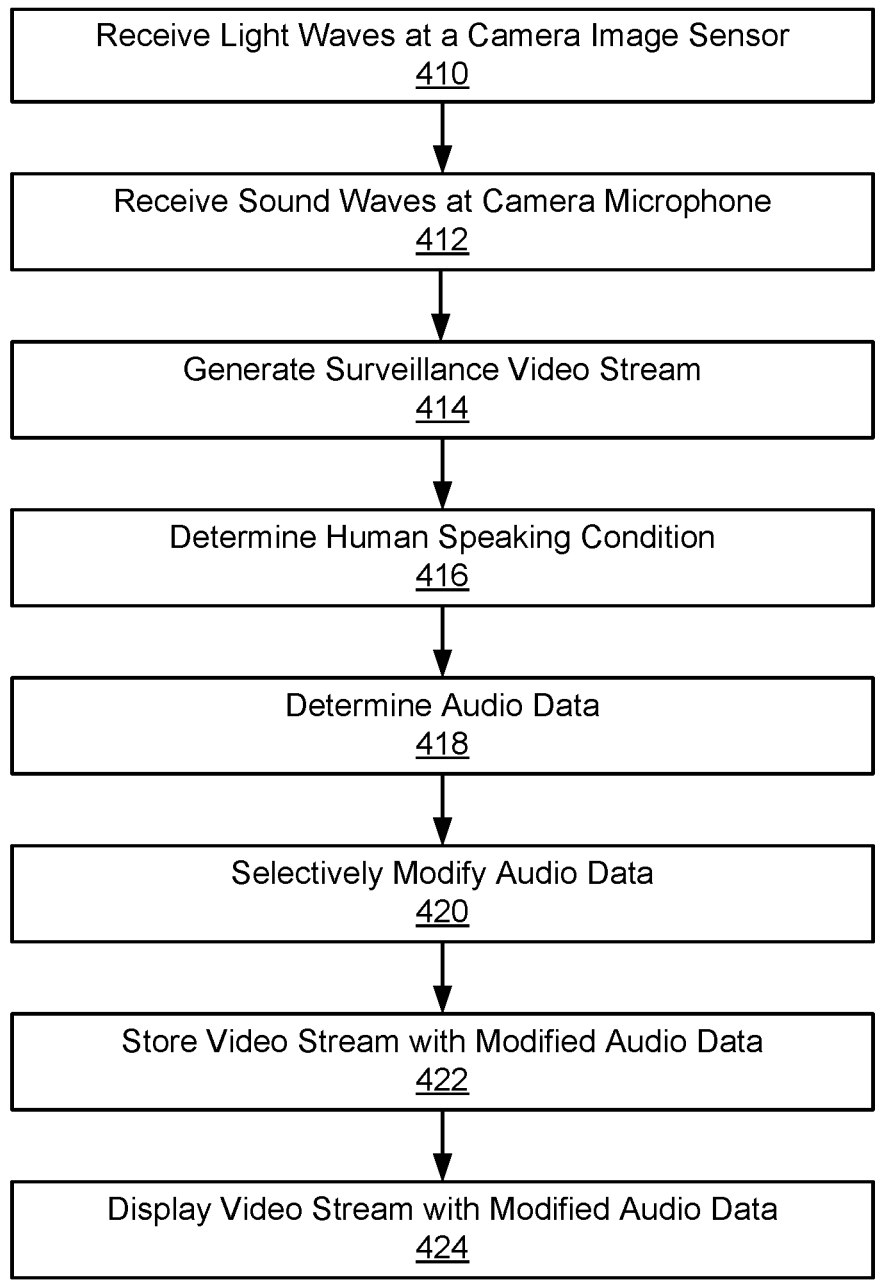
FIG. 4 is a flowchart of an example method of providing an audio privacy mode.

As shown in FIG. 4, surveillance system 300 may be operated according to an example method for providing an audio privacy mode, i.e. according to method 400 illustrated by blocks 410-424 in FIG. 4.

At block 410, light waves may be received at a video camera image sensor. For example, the video camera may activate to capture video continuously or responsive to a trigger condition.

At block 412, sound waves may be received at a video camera microphone. For example, the video camera may be configured to capture audio synchronized with its video image capture when the microphone is enabled.

At block 414, a surveillance video stream may be generated responsive to capture of the image and audio data. For example, the camera may convert the image sensor and microphone data into synchronized image and audio data, encode a video stream with at least one audio channel, and provided the camera video stream to a surveillance controller.

At block 416, a human speaking condition may be determined. For example, a human speech detector in the camera of the surveillance controller may detect at least a portion of the video stream as including human speech.

At block 418, audio data may be determined from the video stream. For example, an audio data processor may read and/or separated the audio data, such as the audio channel, from the image data for processing.

At block 420, the audio data may be selectively modified. For example, during time periods or video portions that include the human speaking condition, the audio data processor may mask at least the human voice component of the audio data.

At block 422, the video stream with the modified audio data may be stored. For example, the surveillance controller may store audio privacy video stream data, including a modified audio channel or track, to one or more storage devices.

At block 424, the video stream with modified audio data may be displayed to a user. For example, a surveillance application running on a user device may receive the privacy video stream data from the surveillance controller and selectively display it on a graphical user interface and speakers of the user device.

Figure 5:
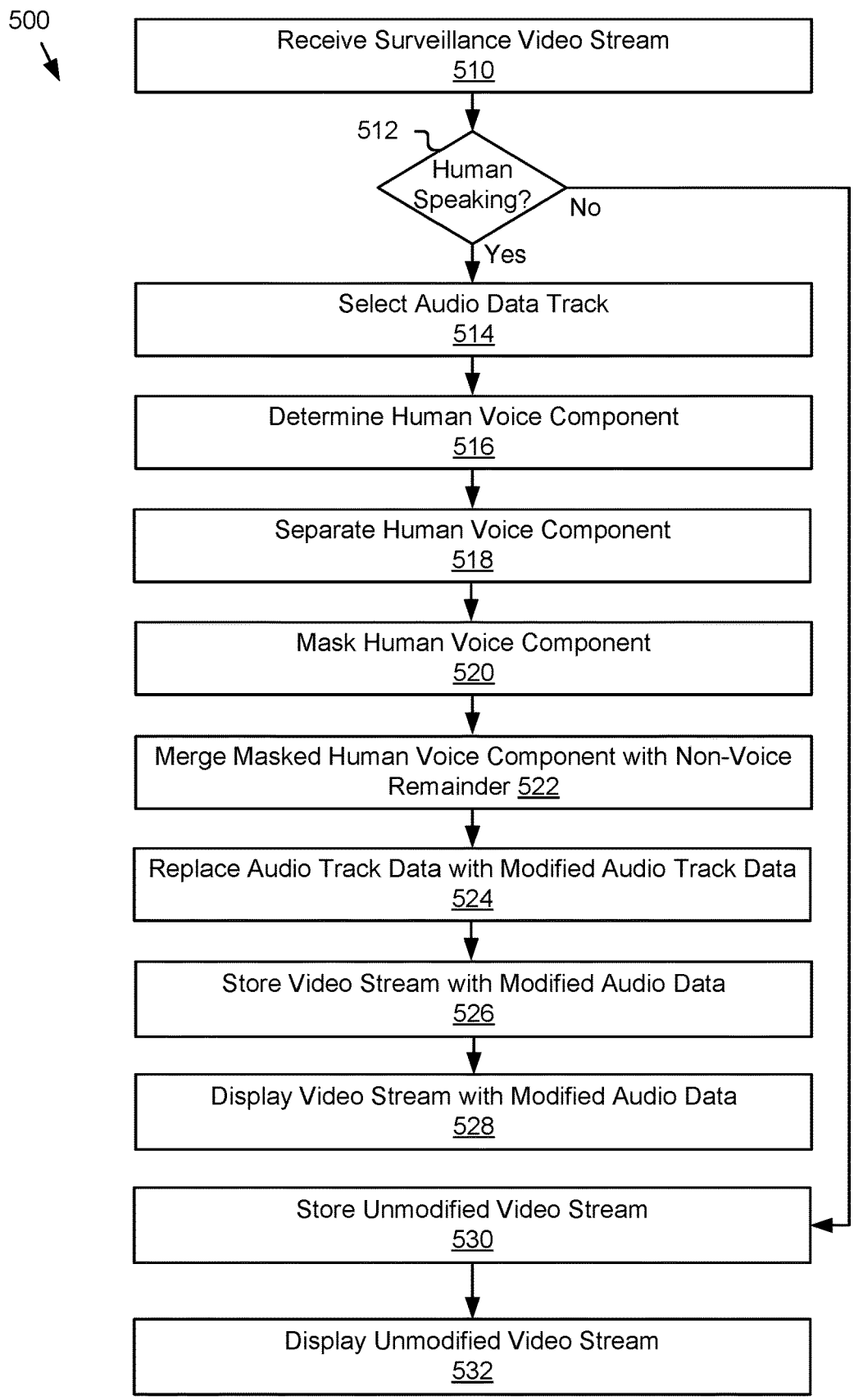
FIG. 5 is a flowchart of an example method of selectively modifying audio data for an audio privacy mode.

As shown in FIG. 5, surveillance system 300 may be operated according to an example method for selectively modifying audio data for an audio privacy mode, i.e. according to method 500 illustrated by blocks 510-532 in FIG. 5.

At block 510, a surveillance video stream may be received. For example, a surveillance controller may receive an encoded camera video stream including a synchronized audio channel.

At block 512, a human speaking condition may be detected. For example, a human voice detector may determine that at least one human voice is present in one or more portions of the camera video stream. If no human speaking condition is detected, method 500 may proceed to block 530 to handle the unmodified video stream. If a human speaking condition is detected, method 500 may proceed to block 514 for processing in accordance with an audio privacy mode to protect the privacy of the human speech component of the video stream.

At block 514, an audio data track may be selected. For example, an audio processor may select the audio track or channel from the video stream that includes the human speech component.

At block 516, a human voice component may be determined. For example, the audio processor may use the human voice detector or a similar algorithm to identify the frequencies or signal patterns containing the human voice component.

At block 518, the human voice component may be separated. For example, the audio processor may separate the identified frequencies or signal patterns from the remainder audio data, such as background noise and non-human voice sources or events.

At block 520, the human voice component may be masked. For example, the audio processor may inject white noise, a masking tone, or other audio signal to cancel or obscure the human voice component in the audio data.

At block 522, the masked human voice component may be merged with the non-voice remainder component. For example, the masked human voice component may be combined with the remainder audio data after the human voice component was separated or removed.

At block 524, the selected audio track from the video stream may be replaced with the modified audio track. For example, the audio processor may provide the modified audio data with the masked human voice component to be synchronized and/or re-encoded with the image data for the video stream.

At block 526, the video stream with the modified audio data may be stored. For example, the surveillance controller may store audio privacy video stream data, including a modified audio channel or track, to one or more storage devices.

At block 528, the video stream with modified audio data may be displayed to a user. For example, a surveillance application running on a user device may receive the privacy video stream data from the surveillance controller and selectively display it on a graphical user interface and speakers of the user device.

At block 530, the unmodified camera video stream may be stored. For example, the surveillance controller may store the camera video stream data, including the original audio channel or track, to one or more storage devices.

At block 532, the unmodified camera video stream may be displayed to a user. For example, a surveillance application running on a user device may receive the camera video stream data from the surveillance controller and selectively display it on a graphical user interface and speakers of the user device, with the human speech intact.

Figure 6:
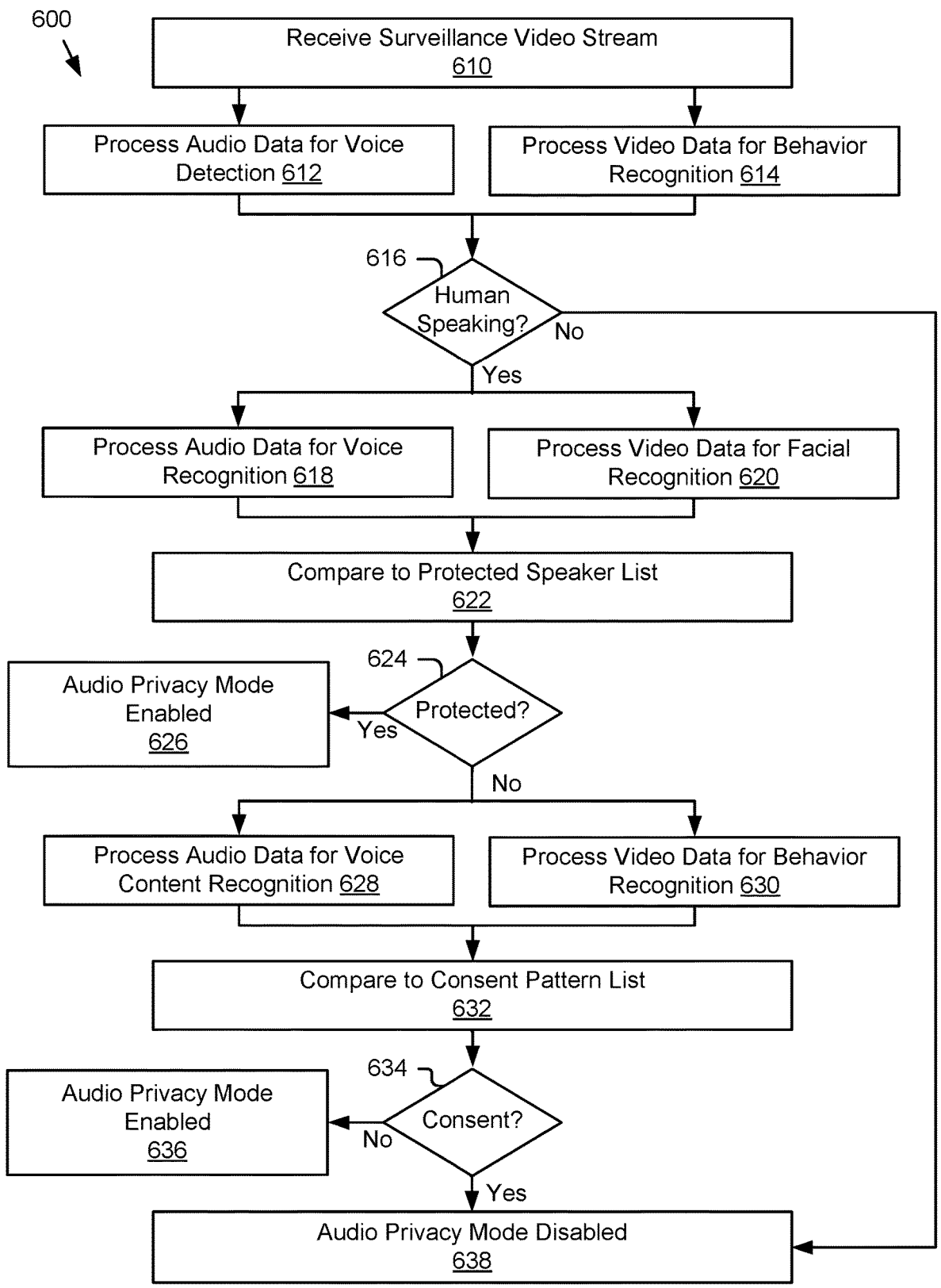
FIG. 6 is a flowchart of an example method of triggering an audio privacy mode.

As shown in FIG. 6, surveillance system 300 may be operated according to an example method for triggering an audio privacy mode, i.e. according to method 500 illustrated by blocks 610-638 in FIG. 6.

At block 610, a surveillance video stream may be received. For example, a surveillance controller may receive an encoded camera video stream including a synchronized audio channel.

At block 612, audio data may be processed for voice detection. For example, a human voice detector may process the audio data of the surveillance video stream to determine with a human voice is present in the audio data.

At block 614, in parallel with block 612 or as an alternative to block 612, video data may be processed for behavior recognition. For example, a behavior recognition engine may process the image data of the surveillance video stream to determine whether one or more humans in the images may be speaking, such as based on mouth movement or other body language.

At block 616, whether or not a human is speaking may be determined based on blocks 612 and/or 614. For example, an event manager may evaluate whether the human voice detector or the behavior recognition engine returned a positive human speech indicator. If no, then audio privacy mode may be disabled at block 638. If yes, method 600 may proceed to blocks 618 and/or 620.

At block 618, audio data may be processed for voice speaker recognition. For example, a voice recognition engine may process the audio data of the surveillance video stream to determine the identity of one or more speakers in the audio data.

At block 620, in parallel with block 618 or as an alternative to block 618, video data may be processed for facial recognition. For example, a facial recognition engine may process the image data of the surveillance video stream to determine whether one or more humans in the images may be an identifiable speaker.

At block 622, one or more speaker identities from blocks 618 and/or 620 may be compared to a protected speaker list. For example, the event manager may compare the identified speakers against a protected speaker list to determine whether one or more speakers are on the protected speaker list.

At block 624, whether or not a protected speaker was detected from the surveillance video stream may be determine based on blocks 628 and/or 630 and block 632. If a protected speaker is detected, then method 600 may enable audio privacy mode at block 626. If no protected speaker is detected, then method 600 may continue to blocks 628 and/or 630.

At block 626, an audio privacy mode may be enabled. For example, an audio processor may operate on the audio data as described for method 500 in FIG. 5.

At block 628, audio data may be processed for voice content recognition. For example, the voice recognition engine may process the audio data of the surveillance video stream to determine whether any consent patterns appear in the speech.

At block 630, in parallel with block 628 or as an alternative to block 628, video data may be processed for behavior recognition. For example, a behavior recognition engine may process the image data of the surveillance video stream to determine whether all speakers have indicated consent through consent patterns in the behavior.

At block 632, one or more patterns from blocks 628 and/or 630 may be compared to a consent pattern list. For example, the voice recognition engine and the behavior recognition engine may maintain sets of consent patterns mapped to particular phrases or body language that can be detected from their respective data.

At block 634, whether or not consent was detected from the surveillance video stream may be determined based on blocks 628 and/or 630 and block 632. For example, the event manager may evaluate whether the voice recognition engine or the behavior recognition engine returned positive consent indicators for all speakers. If yes, audio privacy mode may be disabled at block 638. If no, audio privacy mode may be enabled at block 636.

At block 636, an audio privacy mode may be enabled. For example, an audio processor may operate on the audio data as described for method 500 in FIG. 5.

At block 638, an audio privacy mode may be disabled. For example, the surveillance controller may handle the original video stream without modifying the audio data.

Figure 7:
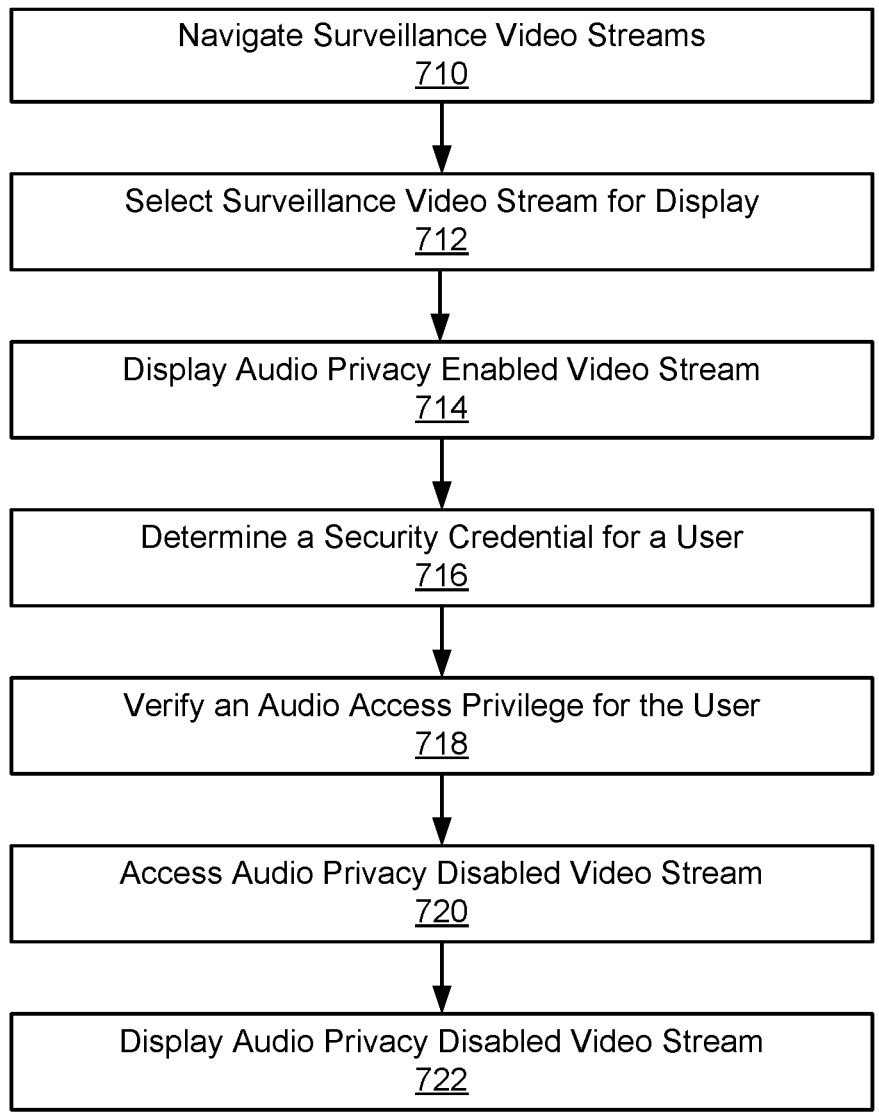
FIG. 7 is a flowchart of an example method of displaying video streams with an audio privacy mode on a user device.

As shown in FIG. 7, surveillance system 300 may be operated according to an example method for displaying video streams with an audio privacy mode on a user device, i.e. according to method 700 illustrated by blocks 710-722 in FIG. 7.

At block 710, available video may be navigated through a graphical user interface. For example, a surveillance application running on a user device may provide a video navigation interface that enables selection, display, and navigation of a video stream, such as play, pause, stop, forward, reverse, faster, slower, etc.

At block 712, a surveillance video stream may be selected for display. For example, the surveillance application may enable a user to select a video stream segment for viewing.

At block 714, an audio privacy enabled video stream may be displayed. For example, the surveillance application may retrieve the selected video stream segment from stored or streaming video data managed by a surveillance controller, the selected video stream may be tagged with an audio privacy mode tag or other indicator, the surveillance controller may provide the audio privacy enabled version of the video stream with modified audio data, and the surveillance application may display the received privacy enabled version of the video stream on a graphical interface display and speakers of the user device.

At block 716, a security credential may be determined for the user. For example, the surveillance application may require the user to login with a security credential prior to displaying any video or may prompt for a security credential in response to the audio privacy mode tag, to allow the user to bypass the voice privacy mode if their credentials allow.

At block 718, an audio access privilege associated with the user and security credential may be verified. For example, the surveillance controller may include access control lists associated with user profiles and determine whether the user has privileges to bypass the audio privacy for the target video stream.

At block 720, the audio privacy disabled video stream may be accessed. For example, responsive to the security credential and audio access privileges, the surveillance controller may provide the original camera video stream with unmodified audio data to the surveillance application.

At block 722, the audio privacy disabled video stream may be displayed. For example, the surveillance application may display the received original camera video stream with unmodified audio data on the graphical interface display and speakers of the user device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a video camera comprising:
   an image sensor configured to capture image data for a video stream; and
   a microphone configured to capture audio data for the video stream; and
   a controller configured to:
   receive the video stream from the video camera;
   determine a human speaking condition from the video stream;
   determine a human voice component of the audio data during the human speaking condition;
   process, responsive to the human speaking condition and using a facial recognition algorithm, the image data in the video stream to identify a speaker identity corresponding to the human voice component;
   determine, based on comparing the speaker identity to a protected speaker data structure, that the speaker identity has a protected speaker status;
   process, responsive to determining that the speaker identity has the protected speaker status and using a voice recognition algorithm, the audio data corresponding to the speaker identity in the video stream to identify an audio consent pattern, wherein the audio consent pattern comprises at least one word in the human voice component of the audio data configured to indicate consent to be recorded;
   selectively modify, responsive to determining that the speaker identity has the protected speaker status and a lack of the audio consent pattern in the audio data corresponding to the speaker identity, the audio data in the video stream during the human speaking condition to mask the human voice component; and
store the video stream with the modified audio data.

2. The system of claim 1, wherein:
the controller is further configured to process, responsive to determining that the speaker identity has the protected speaker status and using a behavior recognition algorithm, the image data corresponding to the speaker identity in the video stream to identify a visual consent pattern;
the visual consent pattern comprises a gesture of a speaker corresponding to the speaker identity and indicates consent to be recorded;
the controller processes the audio data for the audio consent pattern and the image data for the visual consent pattern in parallel; and
selectively modifying the audio data is further responsive to a lack of the visual consent pattern.

3. The system of claim 1, wherein the audio consent pattern includes a phrase selected from a plurality of phrases indicative of consent to be recorded.

4. The system of claim 1, wherein processing the audio data to mask the human voice component of the audio data includes:
separating the human voice component of the audio data from a non-voice remainder component of the audio data;
selectively masking the human voice component of the audio data; and
leaving the non-voice remainder component of the audio data unchanged.

5. The system of claim 1, wherein processing the audio data to mask the human voice component of the audio data further includes:
separating the human voice component of the audio data into a plurality human voice components corresponding to individual speakers of a plurality of speakers;
identifying at least one individual speaker of the plurality of speakers; and
selectively masking, responsive to identifying the at least one individual speaker, a portion of the human voice component of the audio data corresponding to the at least one individual speaker.

6. The system of claim 1, wherein:
the controller is further configured to:
separate the human voice component of the audio data into a plurality of human voice components corresponding to individual speakers of a plurality of speakers detect; and
process, using the voice recognition algorithm, the audio data in the video stream to identify the separated human voice component corresponding to the speaker identity that has protected speaker status; and
selectively modifying the audio data in the video stream during the human speaking condition comprises:
masking the separated human voice component corresponding to the speaker identity that has protected speaker status; and
leaving other human voice components of the plurality of human voice components in the audio data unchanged.

7. The system of claim 1, wherein:
the controller is further configured to process, using a behavior recognition algorithm, the image data in the video stream to identify a visual consent pattern;
the visual consent pattern comprises at least one non-verbal behavior indicative of consent; and
selectively modifying the audio data in the video stream during the human speaking condition is further responsive to an absence of the visual consent pattern in the image data.

8. The system of claim 1, wherein:
the controller is further configured to detect a video event from the image data in the video stream; and
determining the human speaking condition from the video stream is responsive to detecting the video event.

9. The system of claim 1, wherein:
the controller is further configured to process, using the voice recognition algorithm, the audio data in the video stream to identify the speaker identity corresponding to the human voice component; and
determining that the speaker identity has protected speaker status comprises:
comparing a set of audio factors from the audio data to known voiceprints in the protected speaker data structure; and
comparing a set of facial vectors from the image data to known facial vectors in the protected speaker data structure.

10. The system of claim 1, further comprising:
a storage device configured to store:
an unmodified video stream from the video camera; and
the video stream with the modified audio data from the controller;
an analytics engine configured to:
process the unmodified video stream to determine the human speaking condition from the video stream; and
notify the controller of the human speaking condition; and
a user device configured to:
display, using a graphical user interface and a speaker of the user device, the video stream with the modified audio data to a user;
determine a security credential for the user;
verify an audio access privilege corresponding to the security credential; and
display, using the graphical user interface and the speaker of the user device, the unmodified video stream to the user.

11. A computer-implemented method, comprising:
receiving a video stream from a video camera, wherein the video camera comprises:
an image sensor configured to capture image data for the video stream; and
a microphone configured to capture audio data for the video stream;
determining a human speaking condition from the video stream;
determining a human voice component of the audio data during the human speaking condition;
processing, responsive to the human speaking condition and using a facial recognition algorithm, the image data in the video stream to identify a speaker identity corresponding to the human voice component;
determining, based on comparing the speaker identity to a protected speaker data structure, that the speaker identity has a protected speaker status;
processing, responsive to determining that the speaker identity has the protected speaker status and using a voice recognition algorithm, the audio data corresponding to the speaker identity in the video stream to identify an audio consent pattern, wherein the audio consent pattern comprises at least one word in the human voice component of the audio data configured to indicate consent to be recorded;

selectively modifying, responsive to determining that the speaker identity has the protected speaker status and a lack of the audio consent pattern in the audio data corresponding to the speaker identity, the audio data in the video stream during the human speaking condition to mask the human voice component; and storing the video stream with the modified audio data.

12. The computer-implemented method of claim 11, further comprising:

processing, responsive to determining that the speaker identity has the protected speaker status and using a behavior recognition algorithm, the image data corresponding to the speaker identity in the video stream to identify a visual consent pattern, wherein:

the visual consent pattern comprises a gesture of a speaker corresponding to the speaker identity and indicates consent to be recorded;

processing the audio data for the audio consent pattern and the image data for the visual consent pattern occurs in parallel; and selectively modifying the audio data is further responsive to a lack of the visual consent pattern.

13. The computer-implemented method of claim 11, wherein the audio consent pattern includes a phrase selected from a plurality of phrases indicative of consent to be recorded.

14. The computer-implemented method of claim 11, wherein selectively modifying the audio data to mask the human voice component of the audio data includes:

separating the human voice component of the audio data from a non-voice remainder component of the audio data;

selectively masking the human voice component of the audio data; and leaving the non-voice remainder component of the audio data unchanged.

15. The computer-implemented method of claim 11, wherein selectively modifying the audio data to mask the human voice component of the audio data includes:

separating the human voice component of the audio data into a plurality human voice components corresponding to individual speakers of a plurality of speakers;

identifying at least one individual speaker of the plurality of speakers; and selectively masking, responsive to identifying the at least one individual speaker, a portion of the human voice component of the audio data corresponding to the at least one individual speaker.

16. The computer-implemented method of claim 11, further comprising:

separating the human voice component of the audio data into a plurality of human voice components corresponding to individual speakers of a plurality of speakers; and processing, using the voice recognition algorithm, the audio data in the video stream to identify the separated human voice component corresponding to the speaker identity that has protected speaker status, wherein selectively modifying the audio data in the video stream during the human speaking condition comprises:

masking the separated human voice component corresponding to the speaker identity that has protected speaker status; and leaving other human voice components of the plurality of human voice components in the audio data unchanged.

17. The computer-implemented method of claim 11, further comprising:

processing, using a behavior recognition algorithm, the image data in the video stream to identify a visual consent pattern, wherein:

the visual consent pattern comprises at least one non-verbal behavior indicative of consent; and selectively modifying the audio data in the video stream during the human speaking condition is further responsive to an absence of the visual consent pattern in the image data.

18. The computer-implemented method of claim 11, further comprising:

processing, using the voice recognition algorithm, the audio data in the video stream to identify the speaker identity corresponding to the human voice component, wherein determining that the speaker identity has protected speaker status comprises:

comparing a set of audio factors from the audio data to known voiceprints in the protected speaker data structure; and comparing a set of facial vectors from the image data to known facial vectors in the protected speaker data structure.

19. The computer-implemented method of claim 18, further comprising:

storing, in a storage device:

an unmodified video stream from the video camera; and the video stream with the modified audio data;

processing the unmodified video stream to determine the human speaking condition from the video stream;

displaying, using a graphical user interface and a speaker of a user device, the video stream with the modified audio data to a user;

determining a security credential for the user;

verifying an audio access privilege corresponding to the security credential; and displaying, using the graphical user interface and the speaker of the user device, the unmodified video stream to the user.

20. A surveillance system, comprising:

a video camera comprising:

an image sensor configured to capture image data for a video stream; and a microphone configured to capture audio data for the video stream;

a processor;

a memory;

means for receiving the video stream from the video camera;

means for automatically determining a human speaking condition from the video stream;

means for determining a human voice component of the audio data during the human speaking condition;

means for processing, responsive to the human speaking condition and using a facial recognition algorithm, the image data in the video stream to identify a speaker identity corresponding to the human voice component;

means for determining, based on comparing the speaker identity to a protected speaker data structure, that the speaker identity has a protected speaker status;

means for processing, responsive to determining that the speaker identity has the protected speaker status and using a voice recognition algorithm, the audio data corresponding to the speaker identity in the video stream to identify a consent pattern, wherein the consent pattern comprises at least one word in the human voice component of the audio data configured to indicate consent to be recorded;

means for selectively modifying, responsive to determining that the speaker identity has the protected speaker status and a lack of the consent pattern in the audio data corresponding to the speaker identity, the audio data in the video stream during the human speaking condition to mask the human voice component; and means for displaying the video stream using the modified audio data.

* * * * *